US008939437B2

(12) United States Patent
Kobori

(10) Patent No.: US 8,939,437 B2
(45) Date of Patent: Jan. 27, 2015

(54) ANTI-VIBRATION DEVICE

(75) Inventor: Tatsuya Kobori, Kawasaki (JP)

(73) Assignee: Bridgestone Corporation, Tokyo (JP)

( * ) Notice: Subject to any disclaimer, the term of this patent is extended or adjusted under 35 U.S.C. 154(b) by 565 days.

(21) Appl. No.: 13/123,134

(22) PCT Filed: Oct. 9, 2009

(86) PCT No.: PCT/JP2009/067670
§ 371 (c)(1),
(2), (4) Date: Apr. 7, 2011

(87) PCT Pub. No.: WO2010/041749
PCT Pub. Date: Apr. 15, 2010

(65) Prior Publication Data
US 2011/0193278 A1  Aug. 11, 2011

(30) Foreign Application Priority Data

Oct. 9, 2008 (JP) .................................. 2008-262918
May 25, 2009 (JP) .................................. 2009-124970

(51) Int. Cl.
*F16F 7/00* (2006.01)
*F16F 1/373* (2006.01)

(52) U.S. Cl.
CPC .................................. *F16F 1/3735* (2013.01)
USPC .......................... 267/141; 267/140.3; 267/293

(58) Field of Classification Search
CPC ....................................................... F16F 1/3735
USPC ............. 267/141, 141.1, 141.2, 141.3, 141.4, 267/140.3, 140.4, 292, 293, 294
See application file for complete search history.

(56) References Cited

U.S. PATENT DOCUMENTS 2,976,080 A * 3/1961 Moore .......................... 296/35.1
3,159,391 A * 12/1964 Barenyi et al. ................. 267/294

(Continued)

FOREIGN PATENT DOCUMENTS

JP        11-051099 A      2/1999
JP      2003-049902 A      2/2003

(Continued)

OTHER PUBLICATIONS

International Search Report for International Application No. PCT/JP2009/067670 dated Dec. 1, 2009.

*Primary Examiner* — Robert A Siconolfi
*Assistant Examiner* — Charles Poon
(74) *Attorney, Agent, or Firm* — Sughrue Mion, PLLC

(57) ABSTRACT

An anti-vibration device includes a pair of anti-vibration rubbers, each having an outer cylinder connected to any one of a vibration generating body and a vibration receiving body by means of a bracket member and provided with a first flange portion formed on an end portion of an outer side of the outer cylinder in an axial direction to protrude toward an outer side in a radial direction; an inner cylinder connected to the other of the vibration generating body and the vibration receiving body by means of a plate member and disposed at an inner side of the outer cylinder; and a main body rubber disposed between the outer cylinder and the inner cylinder, wherein the pair of anti-vibration rubbers is connected to the bracket member by interposing the bracket member between both sides of the pair of first flange portions in the axial direction so that the inner ends in the axial direction are opposite to each other, and a pair of plate members respectively disposed at outer sides of the pair of main body rubbers in the axial direction is pushed to the inner side in the axial direction by means of a coupling member passing through one pair of the inner cylinders so that the pair of anti-vibration rubbers is interposed between both sides in the axial direction by means of the plate members, and wherein a first stopper rubber made of a rubber material having a hardness equal to or greater than that of the rubber material of the main body rubber is fixed to any one of an inner peripheral surface of the outer cylinder and an outer peripheral surface of the inner cylinder while keeping a gap in the radial direction between the inner peripheral surface of the outer cylinder and the outer peripheral surface of the inner cylinder.

9 Claims, 3 Drawing Sheets

(56) References Cited

U.S. PATENT DOCUMENTS

| | | | |
|---|---|---|---|
| 5,080,335 A * | 1/1992 | Solleder et al. | 267/141.4 |
| 5,743,509 A * | 4/1998 | Kanda et al. | 248/635 |
| 5,842,677 A * | 12/1998 | Sweeney et al. | 248/635 |
| 7,389,977 B1 * | 6/2008 | Fernandez et al. | 267/141.4 |
| 2002/0140146 A1 * | 10/2002 | Nakagawa | 267/141.2 |
| 2005/0280195 A1 * | 12/2005 | Huprikar et al. | 267/141.1 |
| 2006/0202400 A1 * | 9/2006 | Fitzgerald | 267/293 |
| 2008/0143029 A1 * | 6/2008 | Sato et al. | 267/141.1 |
| 2010/0295224 A1 * | 11/2010 | Namito et al. | 267/293 |
| 2012/0098178 A1 * | 4/2012 | Yahata | 267/141.2 |

FOREIGN PATENT DOCUMENTS

| | | | |
|---|---|---|---|
| JP | 2003-065388 A | | 3/2003 |
| JP | 2004-301196 A | | 10/2004 |
| JP | 2006-300106 A | | 11/2006 |
| JP | 2006-300107 A | | 11/2006 |
| JP | 2006300107 A | * | 11/2006 |

* cited by examiner

US 8,939,437 B2

ANTI-VIBRATION DEVICE

CROSS REFERENCE TO RELATED APPLICATIONS

This application is a National Stage of International Application No. PCT/JP2009/067670 filed Oct. 9, 2009, which claims priority from Japanese Patent Application No. 2008-262918 filed Oct. 9, 2008, and Japanese Patent Application No. 2009-124970 filed May 25, 2009, the contents of all of which are incorporated herein by reference in their entirety.

TECHNICAL FIELD

The present invention relates to an anti-vibration device used as a cabin mount, an engine mount, or the like of an agricultural machine or a construction machine.

Priority is claimed on Japanese Patent Application No. 2008-262918 filed on Oct. 9, 2008, and Japanese Patent Application No. 2009-124970 filed on May 25, 2009, the contents of which are incorporated herein by references.

BACKGROUND ART

This kind of anti-vibration device is generally installed between a vibration generating body such as an engine and a vibration receiving body such as a frame body and used for decreasing or absorbing vibrations transferred from the vibration generating body to the vibration receiving body.

As disclosed in the Patent Document 1, for example, this anti-vibration device includes a pair of anti-vibration rubbers respectively having an outer cylinder connected to any one of a vibration generating body and a vibration receiving body by means of a bracket member and provided with a first flange portion formed on an end portion of an outer side thereof in an axial direction to protrude toward an outer side in a radial direction, an inner cylinder connected to the other of the vibration generating body and the vibration receiving body by means of a plate member and disposed at an inner side of the outer cylinder, and a main body rubber disposed between the outer cylinder and the inner cylinder. The pair of anti-vibration rubbers is connected to the bracket member by interposing the bracket member between both sides of a pair of first flange portions in the axial direction so that the inner ends in the axial direction are opposite to each other, and a pair of plate members respectively disposed at outer sides of the pair of main body rubbers in the axial direction is pushed to the inner side in the axial direction by means of a coupling member passing through one pair of the inner cylinders so that the pair of anti-vibration rubbers are interposed between both sides in the axial direction by means of the plate members.

In addition, in the anti-vibration device disclosed in the patent literature 1, the main body rubber is adhered to the outer peripheral surface of the inner cylinder and fitted into the outer cylinder, so that the outer cylinder and the inner cylinder are connected to each other by the same main body rubber.

Patent Document

[Patent Document 1] Japanese Patent Application, First Publication No. 2006-300107
[Patent Document 2] Japanese Patent Application, First Publication No. 2004-301196
[Patent Document 3] Japanese Patent Application, First Publication No. 2006-300106

SUMMARY OF INVENTION

Technical Problem

However, in the conventional anti-vibration device, since the outer cylinder and the inner cylinder are connected by means of the same main body rubber so that the main body rubber is filled between the outer cylinder and the inner cylinder, a spring constant in the radial direction is increased, which makes it difficult to improve the anti-vibration ability.

In addition, when the vibration generating body and the vibration receiving body are relatively greatly displaced in the radial direction, the main body rubber may be excessively compressed and deformed between the outer cylinder and the inner cylinder, and thus the durability of the main body rubber is low.

The invention is made in consideration of the above-described conventional problems, and an object of the invention is to provide an anti-vibration device capable of improving anti-vibration ability and durability.

Solution to Problem

An anti-vibration device of one aspect of the present invention includes a pair of anti-vibration rubbers, each having an outer cylinder connected to any one of a vibration generating body and a vibration receiving body by means of a bracket member and provided with a first flange portion formed on an end portion of an outer side of the outer cylinder in an axial direction to protrude toward an outer side in a radial direction; an inner cylinder connected to the other of the vibration generating body and the vibration receiving body by means of a plate member and disposed at an inner side of the outer cylinder; and a main body rubber disposed between the outer cylinder and the inner cylinder, wherein the pair of anti-vibration rubbers is connected to the bracket member by interposing the bracket member between both sides of the pair of first flange portions in the axial direction so that the inner ends of the pair of anti-vibration rubbers in the axial direction are opposite to each other, and a pair of plate members respectively disposed at outer sides of the pair of main body rubbers in the axial direction is pushed to the inner side in the axial direction by means of a coupling member passing through one pair of the inner cylinders so that the pair of anti-vibration rubbers is interposed between both sides in the axial direction by means of the plate members, and wherein a first stopper rubber made of a rubber material having a hardness equal to or greater than that of the rubber material of the main body rubber is fixed to any one of an inner peripheral surface of the outer cylinder and an outer peripheral surface of the inner cylinder while keeping a gap in the radial direction between the inner peripheral surface of the outer cylinder and the outer peripheral surface of the inner cylinder.

In the invention, since the first stopper rubber is fixed to any one of the inner peripheral surface of the outer cylinder and the outer peripheral surface of the inner cylinder while keeping a gap in the radial direction between the inner peripheral surface of the outer cylinder and the outer peripheral surface of the inner cylinder, it is possible to control a spring constant in the radial direction to a lower level when the vibration generating body and the vibration receiving body are displaced relatively less than the size of the gap in the radial direction, and thus it is possible to improve the anti-vibration ability.

In addition, when the vibration generating body and the vibration receiving body move to become displaced relatively greater than the size of the gap in the radial direction, it is possible to control an amount of deformation of the main body rubber by contacting the first stopper rubber with the other of the inner peripheral surface of the outer cylinder and the outer peripheral surface of the inner cylinder to decompress the displacement, which may improve the durability of the main body rubber.

Further, since the first stopper rubber is made of a rubber material having a hardness equal to or greater than that of the rubber material of the main body rubber, when the first stopper rubber contacts the other of the inner peripheral surface of the outer cylinder and the outer peripheral surface of the inner cylinder as mentioned above, it is possible to increase a repulsive force generated at the first stopper rubber while suppressing an impact force or an impact acceleration occurring at the anti-vibration device, and thus it is possible to securely control the above displacement and reliably control an amount of deformation of the main body rubber.

Here, in the other of the inner peripheral surface of the outer cylinder and the outer peripheral surface of the inner cylinder, a region opposite to the first stopper rubber in the radial direction may be covered with a coating member made of a rubber material.

In this case, since the region of the other of the inner peripheral surface of the outer cylinder and the outer peripheral surface of the inner cylinder, which is opposite to the first stopper rubber in the radial direction, is covered with the coating member, when the vibration generating body and the vibration receiving body move to become displaced relatively greater than the size of the gap in the radial direction, the first stopper rubber contacts the other of the inner peripheral surface of the outer cylinder and the outer peripheral surface of the inner cylinder while interposing the coating member therebetween, so that an impact force or an impact acceleration occurring at the contact can be controlled.

In addition, a second flange portion protruding toward the inner side in the radial direction may be formed at the end portion of the inner side of the outer cylinder in the axial direction, so that the first stopper rubber is fixed to the second flange portion to support the main body rubber from the inner side in the axial direction and protrudes toward more inner side in the radial direction than the inner peripheral edge of the second flange portion In this case, since the main body rubber and the first stopper rubber are supported by the second flange portion from the inner side in the axial direction, it is possible to prevent each deformation of the main body rubber and the first stopper rubber in the axial direction from being excessively increased and deteriorating the durability.

Further, since the first stopper rubber protrudes toward more inner side in the radial direction than the inner peripheral edge of the second flange portion, when the vibration generating body and the vibration receiving body move to become displaced relatively greater than the size of the gap in the radial direction, it is possible to prevent the second flange portion from contacting the outer peripheral surface side of the inner cylinder, so that an impact force or an impact acceleration occurring at the contact can be reliably controlled.

Further, the main body rubber may be made of a rubber material having a dynamic ratio lower than that of the rubber material of the first stopper rubber, and the first stopper rubber may be made of a rubber material having a higher loss tangent than that of the rubber material of the main body rubber.

In this case, since the main body rubber is made of a rubber material having a lower dynamic ratio than the rubber material of the first stopper rubber, the anti-vibration ability of the anti-vibration device can be improved. In addition, since the first stopper rubber is made of a rubber material having a higher loss tangent than the rubber material of the main body rubber, it is possible to more reliably control an impact force or an impact acceleration occurring when the first stopper rubber contacts the other of the inner peripheral surface of the outer cylinder and the outer peripheral surface of the inner cylinder, so that it is possible to prevent an impact force or an impact acceleration applied to the vibration generating body or the vibration receiving body from increasing by providing the first stopper rubber.

In addition, a second stopper rubber made of a rubber material having a hardness equal to or greater than that of the rubber material of the main body rubber and supporting the main body rubber from the outer side in the radial direction may be fixed to the outer surface of the first flange portion facing the outer side in the axial direction, and a gap in the axial direction may be formed between the second stopper rubber and the plate member.

In this case, since the second stopper rubber is fixed to the first flange portion to form a gap in the axial direction between the second stopper rubber and the plate member, it is possible to control a spring constant in the axial direction to a lower level when the vibration generating body and the vibration receiving body displace relatively smaller than the size of the gap in the axial direction, and thus the anti-vibration ability can be improved.

In addition, when the vibration generating body and the vibration receiving body move to become displaced relatively greater than the size of the gap in the axial direction, the deformation of the main body rubber can be controlled by contacting the second stopper rubber with the plate member to suppress the displacement, which improves the durability of the main body rubber.

Further, the second stopper rubber is made of a rubber material having a hardness equal to or greater than that of the rubber material of the main body rubber. Therefore, when the second stopper rubber contacts the plate member as mentioned above, it is possible to increase a repulsive force generated by the second stopper rubber while controlling the impact force or the impact acceleration occurring at the anti-vibration device. And thus it is possible to more securely suppress the above displacement and reliably control the deformation of the main body rubber.

Further, in the first flange portion, a region where the second stopper rubber is fixed may be enlarged toward the outer side in the axial direction.

In this case, since the region of the first flange portion where the second stopper rubber is fixed is enlarged toward the outer side in the axial direction, it is possible to control the size of the second stopper rubber in the axial direction to a smaller level, and thus the durability of the second stopper rubber can be improved.

In addition, the first stopper rubber and the second stopper rubber may be integrally formed with the same rubber material.

In this case, since the first stopper rubber and the second stopper rubber can be integrally formed with the same rubber material, it is possible to control the increase of production costs of the anti-vibration device.

Further, the first stopper rubber may be formed with a ring shape so that a radial gap of the same size is formed over the entire circumference between the first stopper rubber and the other of the inner peripheral surface of the outer cylinder and the outer peripheral surface of the inner cylinder.

In this case, when the anti-vibration device is assembled, there is no need to arrange circumferential positions of the outer cylinder, the first stopper rubber, the inner cylinder, and the main body rubber, and also the increase of production costs of the anti-vibration device can be further reliably controlled.

Further, the stopper formed by bending back the outer peripheral end of the first flange portion in the radial direction toward the outer side in the axial direction may be further provided, so that the second stopper rubber may be fixed to the outer side facing toward the inner side of the stopper in the radial direction to support the second stopper rubber from the outer side in the radial direction, and also the second stopper rubber may extend to more outer side in the axial direction than the stopper.

In this case, when the engine and the frame body move to become displaced relatively greater than the size of the gap B in the axis O direction, and though the second stopper rubber comes into contact with the plate member to additionally deform the second stopper rubber, further displacement (deformation of the main body rubber and the second stopper rubber in the axis O direction) can be controlled by contacting the stopper with the plate member.

Advantageous Effects of Invention

By using the anti-vibration device of the invention, the anti-vibration ability and the durability can be improved.

DESCRIPTION OF EMBODIMENTS

Figure 1:
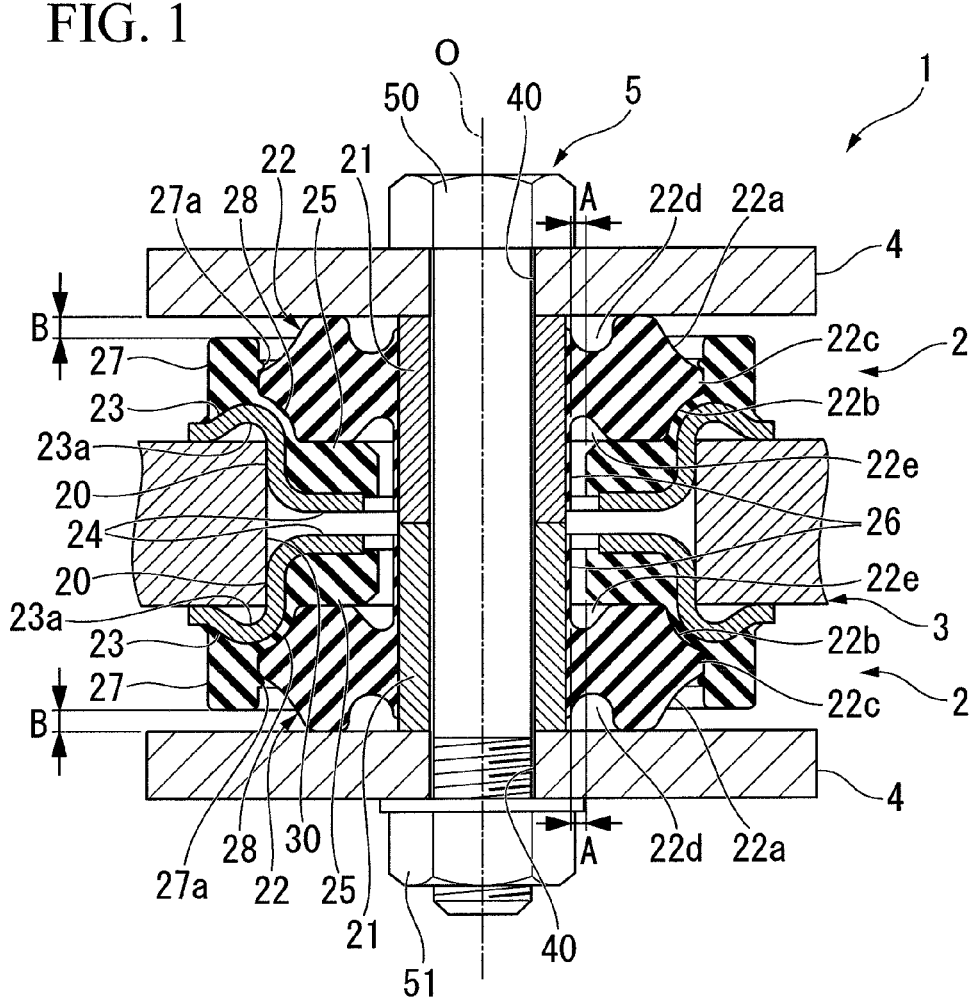
FIG. 1 is a sectional view showing an anti-vibration device for illustrating one embodiment of the invention.

Hereinafter, an anti-vibration device according to one embodiment of the invention will be described with reference to FIGS. 1 and 2.

The anti-vibration device 1 is applied as an engine mount for example, and the transfer of vibrations, which are directed from an engine (a vibration generating body)(not shown) mounted on a construction machine or the like to a frame body (a vibration receiving body)(not shown), is controlled by decreasing or absorbing the input vibrations.

The anti-vibration device 1 has a pair of anti-vibration rubbers 2.

The anti-vibration rubber includes an outer cylinder 20, an inner cylinder 21 formed with a smaller diameter than the outer cylinder 20 and disposed in the outer cylinder 20, and a main body rubber 22 interposed between the outer cylinder 20 and the inner cylinder 21.

The outer cylinder 20, the inner cylinder 21, and the main body rubber 22 are respectively formed with cylindrical shapes and disposed on the common axis. Hereinafter, the common axis is referred to as an axis O.

Also, the pair of anti-vibration rubbers 2 are disposed so as to face each other in the axis O direction and installed on the same axis as the axis O. Hereinafter, in one anti-vibration rubber 2 of the pair of anti-vibration rubber 2, the side toward the other anti-vibration rubber 2 in the axis O direction is called the inner side in the axis O direction, and the side of one anti-vibration rubber 2 opposite to the other anti-vibration rubber 2 in the axis OO direction is called the outer side in the axis O direction.

A first flange portion 23 protruding toward the outer side in a radial direction is formed at the end portion of the outer side in the axis O direction of the outer cylinder 20. The first flange portion 23 continuously extends along the entire circumference of the outer cylinder 20. Also, in the shown example, an enlarged portion 23a enlarging toward the outer side in the axis O direction is formed at the inner end of the first flange portion 23 in the radial direction. Further, a second flange portion 24 protruding toward the inner side in the radial direction is formed at the end portion of the inner side of the outer cylinder 20 in the axis O direction. The second flange portion 24 continuously extends on the entire circumference of the outer cylinder 20. Also, in the shown example, the second flange portion 24 extends in parallel along the radial direction.

The inner cylinder 21 has a longer length than the outer cylinder 20 along the axis O direction, and the inner cylinder 21 is disposed in the outer cylinder 20 while protruding to the outer side from the outer cylinder 20 in the axis O direction. Also, in a state before the anti-vibration device 1 is assembled, as shown in FIG. 2, the end edge of the inner cylinder 21 at the inner side in the axis O direction is located at more outer side in the axis O direction than the end edge of the outer cylinder 20 at the inner side in the axis O direction.

Figure 3:
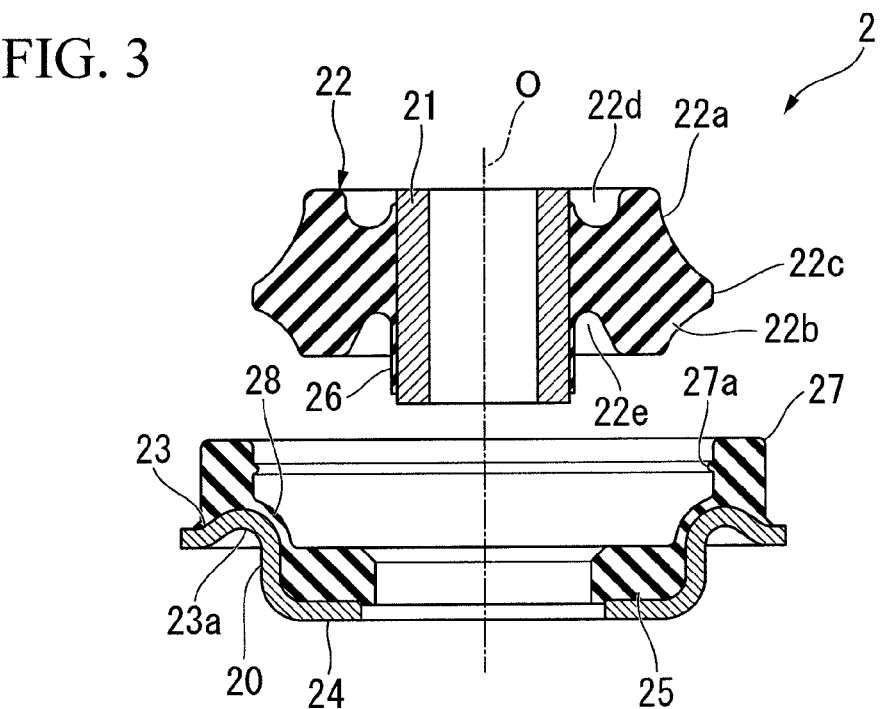
FIG. 3 is a sectional view showing an exploded state of the anti-vibration rubber of FIG. 2.

The main body rubber 22 is formed in a cylindrical shape, and the inner peripheral surface of the main body rubber 22 is vulcanized and adhered to the outer peripheral surface of the inner cylinder 21 so that the outer peripheral surface of the main body rubber 22 is detachably inserted to the inner peripheral surface of the outer cylinder 20 as shown in FIG. 3, thereby elastically connecting the inner cylinder 21 to the outer cylinder 20. In the shown example, in the main body rubber 22, the outer side portion 22a in the axis O direction has a gradually-enlarged diameter from the outer side to the inner side along the axis O direction, and the inner side portion 22b in the axis O direction has a gradually-decreased diameter from the outer side to the inner side along the axis O direction, so that the outer diameter is most increased at the center portion 22c in the axis O direction, located between the portions 22a and 22b. Also, in the outer end surface of the main body rubber 22 oriented to the outer side in the axis O direction, a first annular concave portion 22d is formed at a region connected to the inner cylinder 21. Also, in the inner end surface of the main body rubber 22 oriented to the inner side in the axis O direction, a second annular concave portion 22e having a truly-circular shape around the axis O is formed at a region connected to the inner cylinder 21. Also, the first annular concave portion 22d and the second annular concave portion 22e respectively have a U-shaped vertical cross-section and continuously extend over the entire circumference. Also, the outer end surface of the main body rubber 22 and the end edge of the inner cylinder 21 at the outer side in the axis O direction are located on the same plane orthogonal to the axis O.

Figure 2:
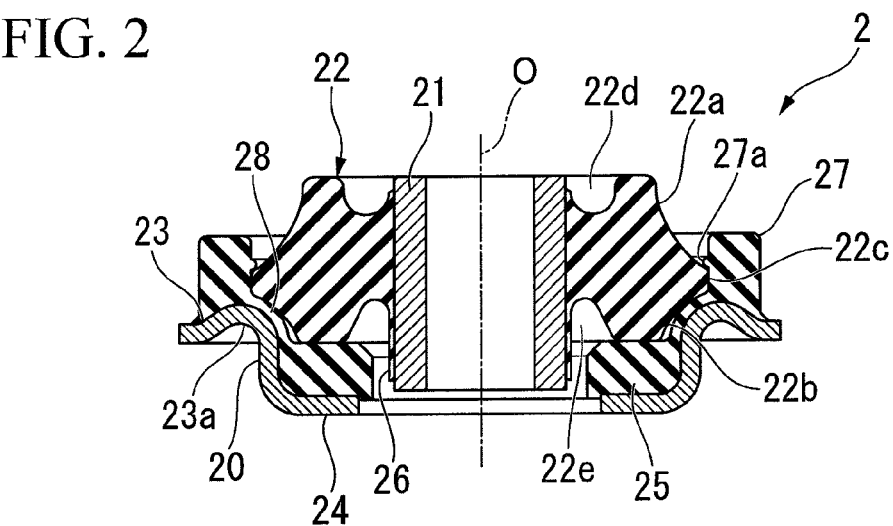
FIG. 2 is a sectional view showing a anti-vibration rubber before the anti-vibration device of FIG. 1 is assembled.

A pair of anti-vibration rubbers 2 configured as above is configured so that the anti-vibration rubbers 2 are vertically symmetric with each other as shown in FIG. 1, and thus the anti-vibration rubbers 2 are disposed on the same axis so that the inner side ends of the anti-vibration rubbers 2 in the axis O direction are opposite to each other. Also, the anti-vibration rubbers 2 are connected to a bracket member 3 by interposing the bracket member 3 between both sides thereof in the axis O direction by means of a pair of first flange portions 23, and also one pair of plate members 4 respectively disposed at the outer side of one pair of main body rubbers 22 in the axis O direction are pushed to the inner side in the axis O direction by means of a coupling member 5 inserted through one pair of inner cylinders 21 so that the anti-vibration rubbers 2 are interposed between both sides in the axis O direction by means of those plate members 4.

The bracket member 3 is a thick plate-type member and is fixed to any one of an engine and a frame body, not shown, to extend in a substantially horizontal direction.

The bracket member 3 has circular mounting holes 30 into which the outer cylinders 20 of one pair of anti-vibration rubbers 2 are respectively inserted separately from both sides in the axis O direction. In the inner and outer surfaces of the bracket member 3, regions around the mounting holes 30 are interposed between both sides in the axis O direction by means of each of the first flange portions 23 of one pair of anti-vibration rubbers 2.

One pair of plate members 4 is plate materials between which one pair of anti-vibration rubbers 2 are interposed between both sides in the axis O direction, and the plate members 4 are respectively mounted to the ends of one pair of anti-vibration rubbers 2 at the outer side in the axis O direction. At least one of one pair of plate members 4 is fixed to the other of an engine and a frame body, not shown. In other words, in a case where the engine is fixed to the bracket member 3, the plate member 4 is fixed to the frame body, while, in a case where the bracket member 3 is fixed to the frame body, the plate member 4 is fixed to the engine. Also, bolt holes 40 are respectively formed in one pair of plate members 4 so that bolts 50, explained later, is inserted. The bolt holes 40 are communicated with the inner cylinder 21.

The coupling member 5 has a bolt 50 and a nut 51. The bolt 50 is inserted from the outer side of any one of the plate members 4 in the axis O direction into the bolt hole 40 of the corresponding plate member 4 so that the bolt 50 is inserted through one pair of upper and lower inner cylinders 21 and the bolt hole 40 of the other plate member 4 and protrudes from the other plate member 4 to the outer side in the axis O direction. In addition, the nut 51 is screwed and securely fastened to the front end portion of the bolt 50 protruding from the bolt hole 40 of the other plate member 4. In this way, the coupling member 5 pushes one pair of plate members 4 to the inner side in the axis O direction so that the bracket member 3 is interposed between both sides in the axis O direction by means of the first flange portion 23 of the outer cylinder 20.

In addition, in this embodiment, a ring-shaped first stopper rubber 25 made of a rubber material having a hardness equal to or greater than that of the rubber material of the main body rubber 22 is fixed to any one of the inner peripheral surface of the outer cylinder 20 and the outer peripheral surface of the inner cylinder 21 while forming a gap A in the radial direction over the entire circumference between the inner peripheral surface of the outer cylinder 20 and the outer peripheral surface of the inner cylinder 21. In the shown example, the first stopper rubber 25 is vulcanized and adhered while forming the gap A in the radial direction between the inner peripheral surface of the outer cylinder 20 and the outer peripheral surface of the inner cylinder 21. Also, the first stopper rubber 25 supports the main body rubber 22 from the inner side in the axis O direction since the inner end surface of the first stopper rubber 25 oriented to the inner side in the axis O direction is vulcanized and adhered to the outer surface of the second flange portion 24 of the outer cylinder 20 oriented to the outer side in the axis O direction.

Here, in this embodiment, in the outer peripheral surface of the inner cylinder 21, a region at more inner side than the main body rubber 22 in the axis O direction and opposite to the inner peripheral surface of the first stopper rubber 25 in the radial direction is covered with a coating member 26 made of a rubber material. In the shown example, the coating member 26 is formed in a thin-walled cylindrical shape so that the gap A in the radial direction is formed between the outer surface of the coating member 26 and the inner peripheral surface of the first stopper rubber 25. Further, since the first stopper rubber 25 is disposed on the same axis as the axis O and continuously extends over the entire circumference, the gap A has a regular size over the entire circumference. Here, the second annular concave portion 22e is perforated in the gap A.

In addition, the coating member 26 is integrally formed with the same rubber material as the main body rubber 22. Further, since the inner diameter of the first stopper rubber 25 is decreased to be smaller than the inner diameter of the second flange portion 24 of the outer cylinder 20, the inner peripheral edge of the first stopper rubber 25 is located at more inner side in the radial direction than the inner peripheral edge of the second flange portion 24.

Also in this embodiment, a ring-shaped second stopper rubber 27 made of a rubber material having a hardness equal to or greater than that of the rubber material of the main body rubber 22 is fixed at the outer surface of the first flange portion 23 of the outer cylinder 20, oriented to the outer side in the axis O direction, to support the main body rubber 22 from the outer side in the radial direction.

Gaps B in the axis O direction are respectively formed between the second stopper rubber 27 and one pair of plate members 4. Also, the second stopper rubber 27 is disposed on the same axis as the axis O and continuously extends over the entire circumference, and thus the gaps B have regular sizes over the entire circumference. Further, the second stopper rubber 27 is installed substantially in the entire region of the outer surface of the first flange portion 23, including the enlarged portion 23a.

Also in this embodiment, the first stopper rubber 25 and the second stopper rubber 27 are integrally formed with the same rubber material. In the shown example, the connection portion between the inner peripheral surface of the outer cylinder 20 and the outer surface of the first flange portion 23 is covered with a thin-walled cylindrical connection piece 28 made of a rubber material, and thus the second stopper rubber 27 is connected to the first stopper rubber 25 via the connection piece 28. Also, the connection piece 28 has a cylindrical shape having a gradually-enlarged diameter from the inner side to the outer side along the axis O direction.

In addition, in the main body rubber 22, the center portion 22c in the axis O direction is inserted into the second stopper rubber 27 and the inner portion 22b in the axis O direction is inserted into the connection piece 28 so that the inner end surface oriented to the inner side in the axis O direction is disposed on the outer end surface of the first stopper rubber 25 oriented to the outer side in the axis O direction. Also, an engagement protrusion 27a to be engaged with the center portion 22c of the main body rubber 22 in the axis O direction from the outer side in the axis O direction is installed to protrude on the inner peripheral surface of the second stopper rubber 27.

Here, the main body rubber 22, the first stopper rubber 25, the coating member 26, the second stopper rubber 27, and the connection piece 28 are respectively made of NR, NBR, or the like. Also, the hardness of the rubber material used for producing the main body rubber 22 and the coating member 26 is considered to be in the range from 40° to 75°, for example, which is lower than the hardness (for example, 70° to 80°) of the rubber material of the first stopper rubber 25, the second stopper rubber 27, and the connection piece 28. Further in this embodiment, the main body rubber 22 and the coating member 26 are made of a rubber material having a lower dynamic ratio than that of the rubber material of the first stopper rubber 25, the second stopper rubber 27, and the connection piece 28. Also, the first stopper rubber 25, the second stopper rubber 27, and the connection piece 28 are made of a rubber material having a higher loss tangent than that of the rubber material of the main body rubber 22 and the coating member 26.

Next, an assembling method of the anti-vibration device 1 having one pair of anti-vibration rubbers 2 as described above will be described.

First, the outer cylinder 20 of one anti-vibration rubber 2 is inserted into the mounting hole 30 from one side of the bracket member 3 in the axis O direction, and the outer cylinder 20 of the other anti-vibration rubber 2 is inserted into the mounting hole 30 from the other side in the axis O direction. At this time, the outer diameter of the outer cylinder 20 is smaller than the inner diameter of the mounting hole 30, and the outer cylinder 20 is inserted without being fitted (loosely inserted) into the mounting hole 30. Also, in this state, the second flange portions 24 of each of one pair of anti-vibration rubbers 2 are opposite to each other in the mounting hole 30 in the axis O direction, and also the first flange portions 23 of each of one pair of anti-vibration rubbers 2 interposes the regions around the mounting holes 30 in the inner and outer surfaces of the bracket member 3 from both sides in the axis O direction.

Next, one pair of plate members 4 are separately disposed respectively on the end surface of one pair of anti-vibration rubbers 2 at the outer side in the axis O direction, namely on the outer end surface of the main body rubber 22 and the end edge of the inner cylinder 21 at the outer side in the axis O direction. Also, the bolt 50 is inserted from the bolt hole 40 of one plate member 4 through one pair of inner cylinders 21 so that the front end portion of the bolt 50 protrudes from the bolt hole 40 of the other plate member 4. After that, the nut 51 is screwed to the front end portion of the bolt 50 so that one pair of plate members 4 is connected by means of the coupling member 5 (the bolt 50).

Next, the bolt 50 and the nut 51 are relatively rotated around the axis O to securely fasten the coupling member 5 so that a gap between one pair of plate members 4 is decreased, thereby pressing one pair of anti-vibration rubbers 2 from both ends in the axis O direction by means of the plate members 4. In this way, the inner cylinder 21 is pushed from the outer cylinder 20 to the inner side in the axis O direction so that the end edge of the inner cylinder 21 at the inner side in the axis O direction is located at more inner side in the axis O direction than the end edge of the outer cylinder 20 at more inner side in the axis O direction. Thus the end edges of the inner cylinders 21 of one pair of anti-vibration rubbers 2 at the inner side in the axis O direction are respectively opposite to each other. Also, the main body rubber 22 is compressed to the inner side in the axis O direction to be elastically deformed so as to swell to the outer side in the radial direction. In this way, the first flange portions 23 of each outer cylinder 20 of one pair of anti-vibration rubbers 2 are closely adhered to the inner and outer surfaces of the bracket member 3 to increase the diameter of the outer cylinder 20, so that the surrounding surface of the outer cylinder 20 is closely adhered to the inner peripheral surface of the mounting hole 30. Also, the gap in the axis O direction is ensured between the second flange portions 24 of each of one pair of anti-vibration rubbers 2. In this way, one pair of anti-vibration rubbers 2 is fixed to the bracket member 3.

Here, the enlarging deformation of the main body rubber 22 toward the outer side in the radial direction is controlled by means of the outer cylinder 20 and the second stopper rubber 27 when the coupling member 5 is securely fastened to compressively strain the main body rubber 22 in the axis O direction as mentioned above. Therefore, the main body rubber 22 is compressively strained not only in the axis O direction but also in the radial direction. Hereinafter, a compression strain of the main body rubber 22 when the anti-vibration device 1 is assembled is referred to as a preliminary compression strain.

In addition, in this embodiment, the preliminary compression strain of the main body rubber 22 in the axis O direction is considered to be greater than the size of the gap B, and also the preliminary compression strain of the main body rubber 22 in the radial direction becomes greater than the size of the gap A.

If a load is applied to the anti-vibration device 1 along the axis O direction in this way, the main body rubber 22 of one anti-vibration rubber 2 is compressively strained in the axis O direction so that the main body rubber 22 of the other anti-vibration rubber 2 is tension-strained in the axis O direction. However, if this strain is greater than the size of the gap B, the second stopper rubber 27 supporting the main body rubber 22 of one anti-vibration rubber 2 from the outer side in the radial direction is contacted with the plate member 4. The second stopper rubber 27 is further compressively strained before the main body rubber 22 of the other anti-vibration rubber 2 is subjected to tension strain greater than the preliminary compression strain in the axis O direction.

At this time, the size of the gap B is set based on the stiffness against the compressive load of the second stopper rubber 27 in the axis O direction and a maximum value of the load applied to the anti-vibration rubber 2 in the axis O direction. Thus the main body rubber 22 of the other anti-vibration rubber 2 is not tension-strained greater than the preliminary compression strain in the axis O direction, and it is possible to prevent the main body rubber 22 from being separated from the plate member 4.

In addition, a case is considered where a load in the radial direction is applied to the anti-vibration device 1 so that the outer cylinder 20 is relatively moved toward the inner cylinder 21 along the radial direction while the main body rubber 22 is elastically deformed in the radial direction. In this case, if the movement becomes greater than the size of the gap A, the inner cylinder 21 comes into contact with the first stopper rubber 25 via the coating member 26 so that the first stopper rubber 25 is compressively strained before the main body rubber 22 elastically deformed in the radial direction greater than the preliminary compression strain in the radial direction. At this time, the size of the gap A is set based on the stiffness of the first stopper rubber 25 against the compressive load in the radial direction and the maximum value of the load applied to the anti-vibration rubber 2 in the radial direction. Accordingly, the main body rubber 22 is not elastically deformed in the radial direction greater than the preliminary compression strain in the radial direction, and it is possible to prevent the main body rubber 22 from being separated from the second stopper rubber 27 and the connection piece 28.

As described above, if the anti-vibration device 1 according to this embodiment is used, the first stopper rubber 25 is fixed while forming the gap A in the radial direction between the inner peripheral surface of the outer cylinder 20 and the outer peripheral surface of the inner cylinder 21. Accordingly, it is possible to control the spring constant in the radial direction to a low level when the engine and the frame body displace in the radial direction relatively smaller than the size of the gap A, thereby improving the anti-vibration ability.

In addition, when the engine and the frame body move to become displaced relatively greater than the size of the gap A in the radial direction, the first stopper rubber 25 comes into contact with the outer peripheral surface side of the inner cylinder 21. Therefore, the displacement can be suppressed to control the deformation of the main body rubber 22, and thus the durability of the main body rubber 22 can be improved.

Further, since the first stopper rubber 25 is made of a rubber material having a hardness equal to or greater than the rubber material of the main body rubber 22. Therefore, when the first stopper rubber 25 comes into contact with the outer peripheral surface side of the inner cylinder 21, it is possible to suppress the impact force or the impact acceleration occurring at the anti-vibration device 1 and increase the repulsive force generated at the first stopper rubber 25. Accordingly, it is possible to securely suppress the above displacement and reliably control the deformation of the main body rubber 22.

Also in this embodiment, since the region of the outer peripheral surface of the inner cylinder 21, which is opposite to the first stopper rubber 25 in the radial direction, is covered with the coating member 26. Therefore, when the engine and the frame body move to become displaced relatively greater than the size of the gap A in the radial direction, the first stopper rubber 25 comes into contact with the outer peripheral surface of the inner cylinder 21 via the coating member 26. Accordingly, the impact force or the impact acceleration generated at the contact can be controlled.

Further, the main body rubber 22 and the first stopper rubber 25 are supported by the second flange portion 24 from the inner side in the axis O direction. Therefore, it is possible to prevent each deformation of the main body rubber 22 and the first stopper rubber 25 in the axis O direction from being excessively increased and the durability thereof deteriorating.

In addition, the first stopper rubber 25 protrudes toward more inner side in the radial direction than the inner peripheral edge of the second flange portion 24.

Therefore, when the engine and the frame body move to become displaced relatively greater than the size of the gap A in the radial direction, it is possible to prevent the second flange portion 24 from contacting the outer peripheral surface side of the inner cylinder 21. Accordingly, the impact force or the impact acceleration generated at the contact can be reliably controlled.

Further, since the main body rubber 22 is made of a rubber material having a dynamic ratio lower than that of the rubber material of the first stopper rubber 25, the anti-vibration ability of the anti-vibration device 1 can be improved. In addition, the first stopper rubber 25 is made of a rubber material having a higher loss tangent than that of the rubber material of the main body rubber 22. Therefore, it is possible to more reliably control the impact force or the impact acceleration occurring when the first stopper rubber 25 comes into contact with the outer peripheral surface of the inner cylinder 21 as described above. Accordingly, it is possible to prevent the impact force or the impact acceleration applied to the engine or the frame body from increasing by providing the first stopper rubber 25.

In addition, the second stopper rubber 27 is fixed to the first flange portion 23 so that the gap B in the axis O direction is formed between the second stopper rubber 27 and the plate member 4. Therefore, it is possible to control the spring constant in the axis O direction to a low level when the engine and the frame body are displaced relatively smaller than the size of the gap B in the axis O direction, thereby improving the anti-vibration performance.

Also, when the engine and the frame body move to be displaced relatively greater than the size of the gap B in the axis O direction, the deformation of the main body rubber 22 can be controlled by contacting the second stopper rubber 27 to the plate member 4 to suppress the displacement, and thus the durability of the main body rubber 22 can be improved.

Further, the second stopper rubber 27 is made of a rubber material having a hardness equal to or greater than that of the rubber material of the main body rubber 22. Therefore, when the second stopper rubber 27 comes into contact with the plate member 4, it is possible to increase the repulsive force generated at the second stopper rubber 27 while controlling the impact force or the impact acceleration occurring at the anti-vibration device 1. Accordingly, the above displacement can be securely suppressed and the deformation of the main body rubber 22 can be reliably controlled.

In addition, the enlarged portion 23a enlarged toward the outer side in the axis O direction is formed at the region of the first flange portion 23 where the second stopper rubber 27 is fixed. Accordingly, it is possible to suppress the size of the second stopper rubber 27 in the axis O direction to a low level, and thus the durability of the second stopper rubber 27 can be improved.

Further, since the first stopper rubber 25 and the second stopper rubber 27 are integrally made of the same rubber material, it is possible to prevent the increase of production costs of the anti-vibration device 1.

In addition, the first stopper rubber 25 is formed with a ring shape so that the gap A of the same size in the radial direction is formed over the entire circumference between the first stopper rubber 25 and the outer peripheral surface of the inner cylinder 21. Therefore, when the anti-vibration device 1 is assembled, there is no need to arrange circumferential positions of the outer cylinder 20, the first stopper rubber 25, the inner cylinder 21, and the main body rubber 22, and also the increase of production costs of the anti-vibration device 1 can be further controlled.

Further in the present embodiment, the anti-vibration rubber 2 is configured so that the inner peripheral surface of the main body rubber 22 is fixed to the outer peripheral surface of the inner cylinder 21, and the outer peripheral surface of the first stopper rubber 25 is fixed to the inner peripheral surface of the outer cylinder 20 so that the main body rubber 22 is detachably inserted to the inner side of the outer cylinder 20 as shown in FIG. 3. Thus, when the anti-vibration device 1 is tuned, any one of the inner cylinder 21 to which the main body rubber 22 is fixed and the outer cylinder 20 to which the first stopper rubber 25 is fixed can be exchanged with another one having a different rubber material or size, and thus the tuning work can be performed with high efficiency and high precision.

In addition, the scope of the invention is not limited to the above embodiments, but various changes can be made within the scope of the invention.

For example, though the first stopper rubber 25 has a ring shape in this embodiment, the shape of the first stopper rubber 25 may be suitably changed into a block shape or the like, without being limited to the above. In this configuration, the installation position of the first stopper rubber 25 is not limited to a point symmetry arrangement around the axis O, but the first stopper rubber 25 may be installed at any location having a gap around the axis O. In this case, a positioning protrusion, a concave portion, or a mark or the like may be formed such as at the inner cylinder 21 and the outer cylinder 22 of the anti-vibration rubber 2 in order to determine the position around the axis O.

In addition, though the first stopper rubber 25 is fixed to the outer peripheral surface of the inner cylinder 21, it may be suitably changed, without being limited to the above. For example, the first stopper rubber 25 may also be fixed to the inner peripheral surface of the outer cylinder 20 to form the gap A between the first stopper rubber 25 and the inner cylinder 21.

Further, the first stopper rubber 25 may have a ring shape such as an oval shape, for example, without being limited to a truly circular shape.

In addition, the second flange portion 24 and the enlarged portion 23a may not be formed at the outer cylinder 20.

Further, an anti-vibration device not having the coating member 26, the connection piece 28, the second stopper rubber 27, the first annular concave portion 22d, and the second annular concave portion 22e may also be used.

In addition, though the second annular concave portion 22e having a truly circular shape based on the axis O is formed at the main body rubber 22, a suitable change can be made instead. For example, a plurality of spot-type concave portions or an oval-shaped concave portion may be used.

Further, the inner peripheral edge of the second flange portion 24 may be covered with the inner peripheral edge of the first stopper rubber 25.

In addition, though one pair of anti-vibration rubbers 2 uses the same anti-vibration rubbers 2 in the above embodiment, one pair of anti-vibration rubbers 2 of the invention may use anti-vibration rubbers having different configurations. For example, anti-vibration rubbers in which the outer cylinder 20, the inner cylinder 21, or the main body rubber 22 or the like has different materials or different shapes may be used in combination.

In addition, in the above embodiment, the preliminary compression strain of the main body rubber 22 in the radial direction is set to be greater than the size of the gap A so that the main body rubber 22 is not elastically deformed in the radial direction greater than the preliminary compression strain in the radial direction. Therefore, it is prevented that the main body rubber 22 is separated from the second stopper rubber 27 and the connection piece 28. However, without being limited to the above, the main body rubber 22 may be elastically deformed in the radial direction equal to or greater than the preliminary compression strain in the radial direction by setting the preliminary compression strain of the main body rubber 22 to be equal to or smaller than the size of the gap A. Therefore, the main body rubber 22 may be separated from the second stopper rubber 27 and the connection piece 28.

Figure 4:
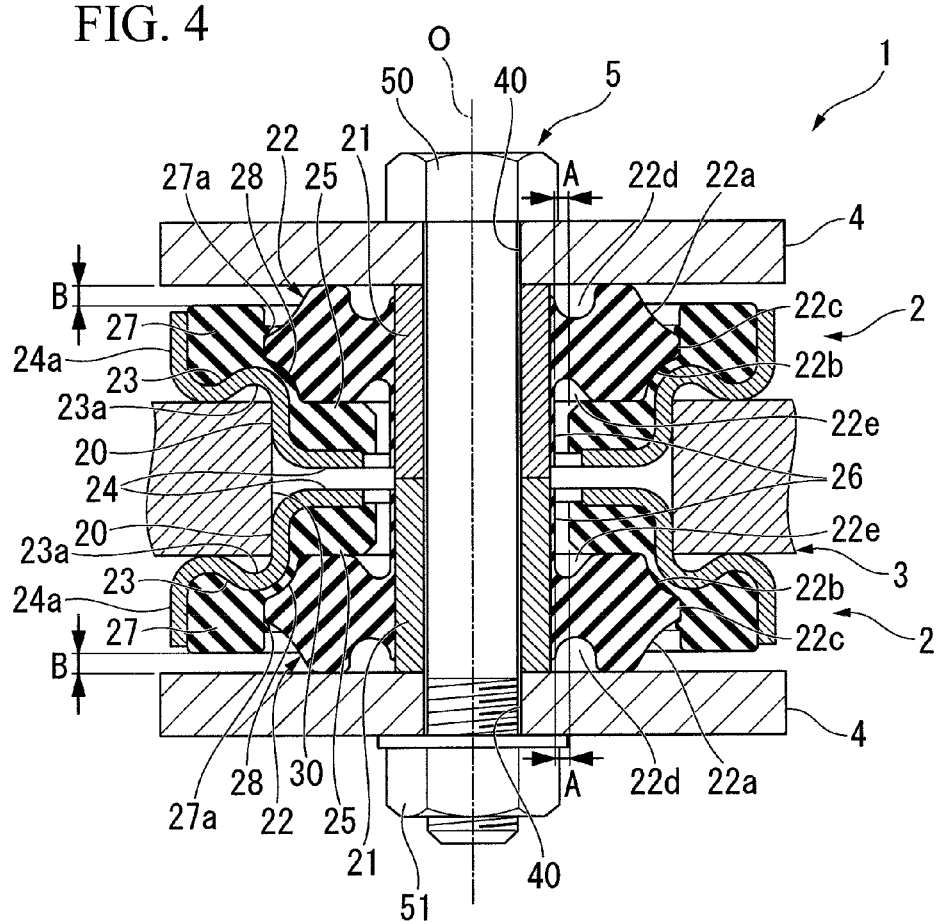
FIG. 4 is a sectional view showing an anti-vibration device for illustrating another embodiment of the invention.

In addition, as shown in FIG. 4, a stopper 24a bending back to the outer side in the axis O direction (to the axial outer side) is further formed at the outer side edge of the first flange portion 23 in the radial direction. The second stopper rubber 27 is fixed to the outer surface of the stopper 24a facing toward the inner side in the radial direction so that the second stopper rubber 27 is supported from the outer side in the radial direction.

In this case, the end of the second stopper rubber 27 at the outer side in the axis O direction protrudes toward more outer side in the axis O direction than the stopper 24a.

In the anti-vibration device 10 as described above, when the engine and the frame body move to be displaced in the axis O direction relatively greater than the size of the gap B and the second stopper rubber 27 comes into contact with the plate member 4 to further deform the second stopper rubber 27, further displacement (the deformation of the main body rubber 22 and the second stopper rubber 27 in the axis O direction) can be suppressed by contacting the stopper 24a with the plate member 4.

In addition, within the scope not departing from the scope of the invention, any component in the above embodiment may be suitably replaced with a well-known component, and also the above modifications may be suitably combined.

Industrial Applicability

If the anti-vibration device of the embodiment of the present invention is used, the anti-vibration ability and the durability can be improved.

REFERENCE SIGNS LIST 1, 10: ANTI-VIBRATION DEVICE
2: ANTI-VIBRATION RUBBER
3: BRACKET MEMBER
4: PLATE MEMBER
5: COUPLING MEMBER
20: OUTER CYLINDER
21: INNER CYLINDER
22: MAIN BODY RUBBER
23: FIRST FLANGE PORTION
23a: ENLARGED PORTION
24: SECOND FLANGE PORTION
24a: STOPPER
25: FIRST STOPPER RUBBER
26: COATING MEMBER
27: SECOND STOPPER RUBBER
30: MOUNTING HOLE
A: GAP IN THE RADIAL DIRECTION
B: GAP IN THE AXIAL DIRECTION
O: AXIS

The invention claimed is:

1. An anti-vibration device, comprising:
a pair of anti-vibration rubbers, each having:
an outer cylinder connected to any one of a vibration generating body and a vibration receiving body by means of a bracket member and provided with a first flange portion formed on an end portion of an outer side of the outer cylinder in an axial direction to protrude toward an outer side in a radial direction;
an inner cylinder connected to the other of the vibration generating body and the vibration receiving body by means of a plate member and disposed at an inner side of the outer cylinder; and
a main body rubber disposed between the outer cylinder and the inner cylinder,
wherein the pair of anti-vibration rubbers is connected to the bracket member by interposing the bracket member between both sides of the pair of first flange portions in the axial direction so that the inner ends of the pair of anti-vibration rubbers in the axial direction are opposite to each other, and a pair of plate members respectively disposed at outer sides of the pair of main body rubbers in the axial direction is pushed to the inner side in the axial direction by means of a coupling member passing through one pair of the inner cylinders so that the pair of anti-vibration rubbers is interposed between both sides in the axial direction by means of the plate members,
wherein a first stopper rubber made of a rubber material having a hardness equal to or greater than that of the rubber material of the main body rubber is fixed to any one of an inner peripheral surface of the outer cylinder and an outer peripheral surface of the inner cylinder while keeping a gap in the radial direction between the inner peripheral surface of the outer cylinder and the outer peripheral surface of the inner cylinder, wherein the first stopper rubber supports the main body rubber, wherein a second flange portion protruding toward the inner side in the radial direction is formed at an end portion of an inner side of the outer cylinder in the axial direction, and wherein the first stopper rubber is fixed to the second flange portion to support the main body rubber from the inner side in the axial direction and protrudes more inwardly in the radial direction than an inner peripheral edge of the second flange portion.

2. The anti-vibration device according to claim 1, wherein, in the other of the inner peripheral surface of the outer cylinder and the outer peripheral surface of the inner cylinder, a region opposite to the first stopper rubber in the radial direction is covered with a coating member made of a rubber material.

3. The anti-vibration device according to claim 1,
wherein the main body rubber is made of a rubber material having a dynamic ratio lower than that of the rubber material of the first stopper rubber, and
wherein the first stopper rubber is made of a rubber material having a higher loss tangent than that of the rubber material of the main body rubber.

4. The anti-vibration device according to claim. 1,
wherein a second stopper rubber made of a rubber material having a hardness equal to or greater than that of the rubber material of the main body rubber and supporting the main body rubber from the outer side in the radial direction is fixed to an outer surface of the first flange portion facing toward the outer side in the axial direction, and
wherein a gap in the axial direction is formed between the second stopper rubber and the plate member.

5. The anti-vibration device according to claim 4, wherein a region of the first flange portion where the second stopper rubber is fixed is enlarged toward the outer side in the axial direction.

6. The anti-vibration device according to claim 4, wherein the first stopper rubber and the second stopper rubber are integrally formed with the same rubber material.

7. The anti-vibration device according to claim 4, further comprising a stopper formed by bending back the outer peripheral end of the first flange portion in the radial direction toward the outer side in the axial direction,
wherein the second stopper rubber is fixed to the outer surface of the stopper toward the inner side in the radial direction so that the second stopper rubber is supported from the outer side in the radial direction, and the second stopper rubber extends to more outer side in the axial direction than the stopper.

8. The anti-vibration device according to claim 6, further comprising a stopper formed by bending back the outer peripheral end of the first flange portion in the radial direction toward the outer side in the axial direction,
wherein the second stopper rubber is fixed to the outer surface of the stopper facing toward the inner side in the radial direction so that the second stopper rubber is supported from the outer side in the radial direction, and the second stopper rubber extends to more outer side in the axial direction than the stopper.

9. The anti-vibration device according to claim. 1, further comprising a second flange portion protruding toward the inner side in the radial direction is formed at an end portion of the inner side of the outer cylinder in the axial direction, and the first stopper rubber is vulcanized and adhered to the second flange portion and supports the main body rubber from the inner side in the axial direction.

* * * * *